United States Patent
Birenboim et al.

(10) Patent No.: US 9,058,670 B2
(45) Date of Patent: Jun. 16, 2015

(54) TRAJECTORY DETECTION AND ANALYSIS IN SPORTING EVENTS

(75) Inventors: Michael Birenboim, Holon (IL); Roy Tenny, Ramat-Hasharon (IL); Yuri Shpalensky, Givataim (IL); Danielle Shor, Ramat Gan (IL); Gal Oz, Kfar-Sava (IL)

(73) Assignee: Stats LLC, Northbrook, IL (US)

( * ) Notice: Subject to any disclaimer, the term of this patent is extended or adjusted under 35 U.S.C. 154(b) by 422 days.

(21) Appl. No.: 13/098,487

(22) Filed: May 2, 2011

(65) Prior Publication Data

US 2011/0267461 A1 Nov. 3, 2011

Related U.S. Application Data

(60) Provisional application No. 61/330,410, filed on May 3, 2010.

(51) Int. Cl.
*H04N 7/18* (2006.01)
*G06T 7/20* (2006.01)

(52) U.S. Cl.
CPC ............ *G06T 7/2006* (2013.01); *G06T 7/2093* (2013.01)

(58) Field of Classification Search
USPC ........................ 348/135, 139, 142, 143, 157
See application file for complete search history.

(56) References Cited

U.S. PATENT DOCUMENTS

| | | | |
|---|---|---|---|
| 6,072,504 A | 6/2000 | Segen | |
| 7,713,148 B2 * | 5/2010 | Sweeney | 473/404 |
| 7,978,217 B2 * | 7/2011 | Camhi | 348/157 |
| 2007/0177024 A1 | 8/2007 | Camhi | |
| 2008/0182685 A1 | 7/2008 | Marty et al. | |
| 2008/0312010 A1 * | 12/2008 | Marty et al. | 473/447 |
| 2010/0209090 A1 * | 8/2010 | Kludas | 396/89 |
| 2010/0210377 A1 * | 8/2010 | Lock | 473/409 |
| 2011/0243543 A1 * | 10/2011 | Pace et al. | 396/325 |

FOREIGN PATENT DOCUMENTS

WO WO2009039367 3/2009

OTHER PUBLICATIONS

Jorge Orbay MD "Volar Plate Fixation of Distal Radius Fractures", Hand Clin 21 (2005) p. 347-354.

* cited by examiner

*Primary Examiner* — Christopher S Kelley
*Assistant Examiner* — Jonathan Messmore
(74) *Attorney, Agent, or Firm* — Mark M. Friedman (57) ABSTRACT

It is provided a method for conveying data on a flying object in a scene. The method including capturing video frames of the scene by video cameras to get video frames which include image of the object, identifying the object in captured video frames to get associated object parameters, calculating motion variables, solving motion equations for anticipated object trajectory taking into account certain effects, and conveying data to displaying devices. The certain effects are an effect of object collision with a ground surface, air friction, wind effect, and interaction of a spinning object with air. The method may be applied to a ball in a sporting playing field. The cameras may have variable operating parameters desirable for the calculating the motion variables, which may be determined by camera calibration using captured artifacts of the scene. Shadow of the object may be captured as well and be used to provide data absent due to occluding a of the object from a video camera. Also, the captured frames of a ball may be used to calculate parameters relating to a bat which hits the ball.

3 Claims, 6 Drawing Sheets

TRAJECTORY DETECTION AND ANALYSIS IN SPORTING EVENTS

CROSS REFERENCE

The current application claims the priority rights of U.S. provisional application No. 61/330,410 entitled "SYSTEM AND METHOD FOR TRAJECTORY DETECTION" filed May 3, 2010

BACKGROUND OF THE INVENTION

1. Field of the Invention

The invention is in the field of visual coverage of sporting events, and in special deals with anticipating and analyzing object trajectory in sports involving flying objects of a variety of kinds, baseball, football, golf, tennis, etc.

2. Description of Related Art

Since the invention of the television set, sporting events are captured by video cameras and are broadcasted to interesting viewers all over the globe. Over time, great efforts have been paid for improvement of the data presented to viewers. For that sake, several cameras are placed around a playing field, areas of intensive activity are zoomed in, and game segments are presented in slow motion. Such improvements enhance the viewer experience and furnish vital performance data to coachers and commentators.

A ball or other flying object has a central rule in many sports, and therefore its trajectory attracted some attention, In the past, ball trajectories have been calculated and presented using simplified physical models, and solving ballistic equations of motion. However, balls interact with players, with moving objects like bat, and with fixed objects like the ground. While flying in air, balls interact with the air by effects like friction, wind and effect of spin on curving the trajectory beyond gravity. Therefore, the data achieved in the past on ball trajectory lack accuracy and analysis of those interactions. There is a need for, and it would be advantageous to have greater accuracy of the ball trajectory, to overcome absence of data in specific cases like ball occlusion during a game, and to take care of collisions with ground and with bats.

BRIEF SUMMARY OF THE INVENTION

It is provided, according to some embodiments of the current invention, a method for conveying data on a flying object in a scene. The method including capturing video frames of the scene by video cameras to get video frames which include image of the object, identifying the object in captured video frames to get associated object parameters, calculating motion variables of the object using the object parameters, solving motion equations for anticipated object trajectory taking into account certain effects, and conveying data related to the anticipated object trajectory to displaying devices. The certain effects are an effect of object collision with a ground surface, air friction, effect of wind on the object, and interaction of a spinning object with air.

Preferably, the scene is a sporting playing field, and the flying object is a sporting ball.

In some embodiments, the method is used for conveying data on a throwing action in a sporting event.

In some embodiments, the effect of object collision with a ground surface is characterized by a bounciness coefficient, and by parameters associated with direction of a bounced object.

In some embodiments, cameras have variable operating parameters desirable for the calculating the motion variables.

Preferably, the cameras are calibrated using captured artifacts of the scene. Alternatively, the cameras are calibrated using data provided by a device measuring parameters associated with the scene.

In some embodiments, the anticipated object trajectory complements data absence caused by occluding the object from a video camera.

In some embodiments, the step of conveying data related to the anticipated object trajectory is performed fast enough to precede the actual object trajectory.

It is provided a program storage device readable by a computer, tangibly embodying the method executable by the computer to convey data on the flying object.

It is provided according to some embodiments of the current invention a method for conveying data on a flying object in a scene illuminated by a light source of small angular extension, such as to create clear shadow of the flying object. The method includes capturing video frames of the scene by video cameras to get video frames including images of the object and video frame including image of the object shadow, identifying the object in captured video frames to get object parameters associated with the captured video frames, identifying the object shadow in captured video frame to get associated parameters of the object shadow, calculating motion variables of the object using the object parameters using the parameters of the object shadow and using parameters associated with the light source, and based on the calculated motion variables, solving motion equations for anticipated object trajectory, and conveying data related to the anticipated object trajectory as calculated using the parameters of the object shadow to displaying devices.

In some embodiments, the method complements data absence caused by occluding of the object from a video camera.

It is provided according to some embodiments of the current invention a method for conveying data relating to a collision occurring in a playing field between of a first object and a second object. The method includes capturing several video frames of the playing field by video cameras to get video frames which include images of the first object, identifying the first object in captured video frames to obtain parameters of the first object in the captured video frames before the collision, calculating motion variables of the first object before the collision using the obtained parameters, calculating parameters associated with the second object in relation to the collision, and conveying data related to the calculated parameters to devices.

Preferably, the method includes also capturing video frames of the playing field which include images of the first object after the collision, identifying the first object in the captured video frames to get parameters of the first object after the collision, calculating motion variables of the first object after the collision, and calculating motion variables of the second object in relation to the collision based on the calculated motion variables of the first object before and after the collision.

Alternatively, parameters of the second object are used in conjunction with the calculated motion variables of the first object before the collision to calculate additional parameters of the second object related to the collision.

In some embodiments the method includes calculating position of the second object in the collision, its velocity in relation to the collision, and time of the collision.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

The present invention will now be described in terms of specific example embodiments. It is to be understood that the invention is not limited to the example embodiments disclosed. It should also be understood that not every feature of the disclosed methods is necessary to implement the invention as claimed in any particular one of the appended claims. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Improved Trajectory Calculation Embodiment

Figure 1:
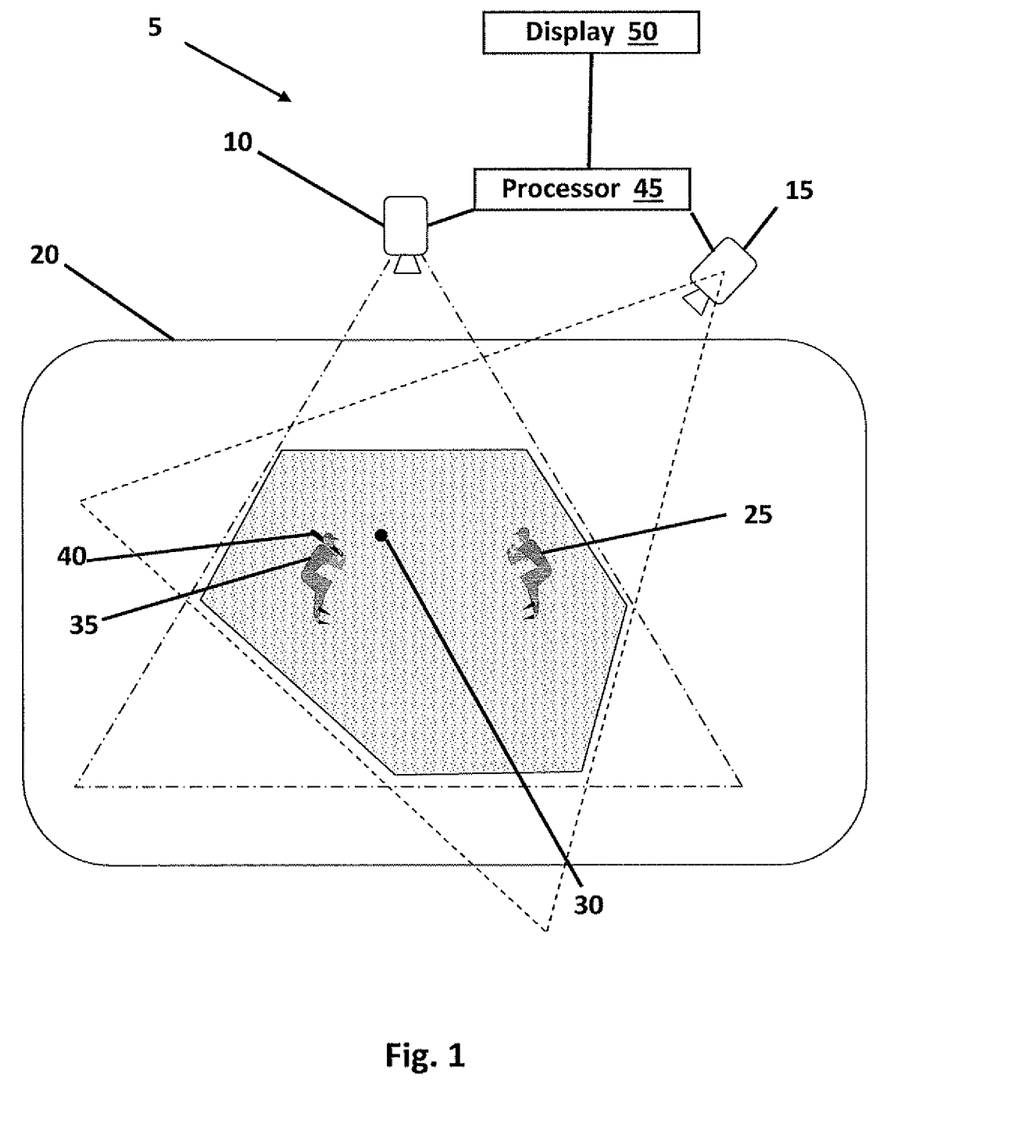
FIG. 1 illustrates capturing events in a sporting field by two video cameras.

An exemplary system 5 for detection and calculation of a ball trajectory is illustrated in FIG. 1. Video cameras 10 and 15 capture the home plate and diamond parts of a baseball field 20 (not to scale) whereas a pitcher 25 has just thrown a ball 30 which propagates in the air towards a batter 35 holding a bat 40 ready to hit ball 30 and send it into a long air trajectory. As cameras 10 and 15 capture the scene from different directions, a connected processor 45 identifies ball 30 in captured video frames using well known image processing methods, and is able to calculate three dimensional ball position at certain times. Using that position data as initial condition, processor 45 solves equations of motion of ball 30, and thus provides the anticipated ball trajectory. In the prior art, mainly gravitation was considered in the motion equations of a ball in a playing field. However, improved accuracy of the anticipated ball trajectory may be achieved by taking into account several additional forces which influence the ball trajectory.

In special, while moving in the air the ball is subjected to a variety of air effects, including air friction and wind. In addition, a ball may get substantial spin while being hit or thrown, and the interaction of a spinning object with air may give rise to some deflection from a gravitational-ballistic trajectory.

A ball thrown in a sporting field may hit a hard surface, mostly the ground, and continue its trajectory after being bounced from the surface. The effect of bouncing is characterized by a bounciness coefficient expressing energy loss in the bouncing, and by parameters expressing the scattering of the ball direction around a reflection angle which equals the hit angle. Data on ball bounciness is well known for ground surfaces and balls used in a variety of sports, is a popular subject in science fairs, and is presented in numerous websites.

The calculated trajectory may be conveyed to commentators and viewers in a variety of ways. First, an anticipated trajectory may be displayed on a commentator display 50, furnishing the commentator an enhanced ability to analyze events. Secondly, the anticipated trajectory may complement segments of an actual ball trajectory which are hidden from all video cameras capturing the playing field, or hidden from some of the cameras. In addition, a variety of statistics on trajectories may be gathered for presentation and analysis by commentators, coaches, and players. Graphical animations showing trajectories and calculated statistics may be provided to the broadcast industry for presentation to viewers.

Cameras 10 and 15 have various parameters that describe internal (i.e. zoom, distortion, aspect ratio, resolution etc) and external (position, rotation, etc) states. The system may detect at least part of those parameters using a known location of pre existing artifacts in the predefined area (lines on a game field, goal posts, etc). In a typical example, two tennis players are using a tennis field with a net between the players. The location of the net relative to the two cameras, as well as the net dimensions, are used to deduce camera parameters from pose and size of the imaged net. In some cases the system uses a measuring device (i.e. geodesic measuring device, or a laser rangefinder) in conjunction game field lines, and thus accurately measure the relative pose of the cameras.

Figure 2:
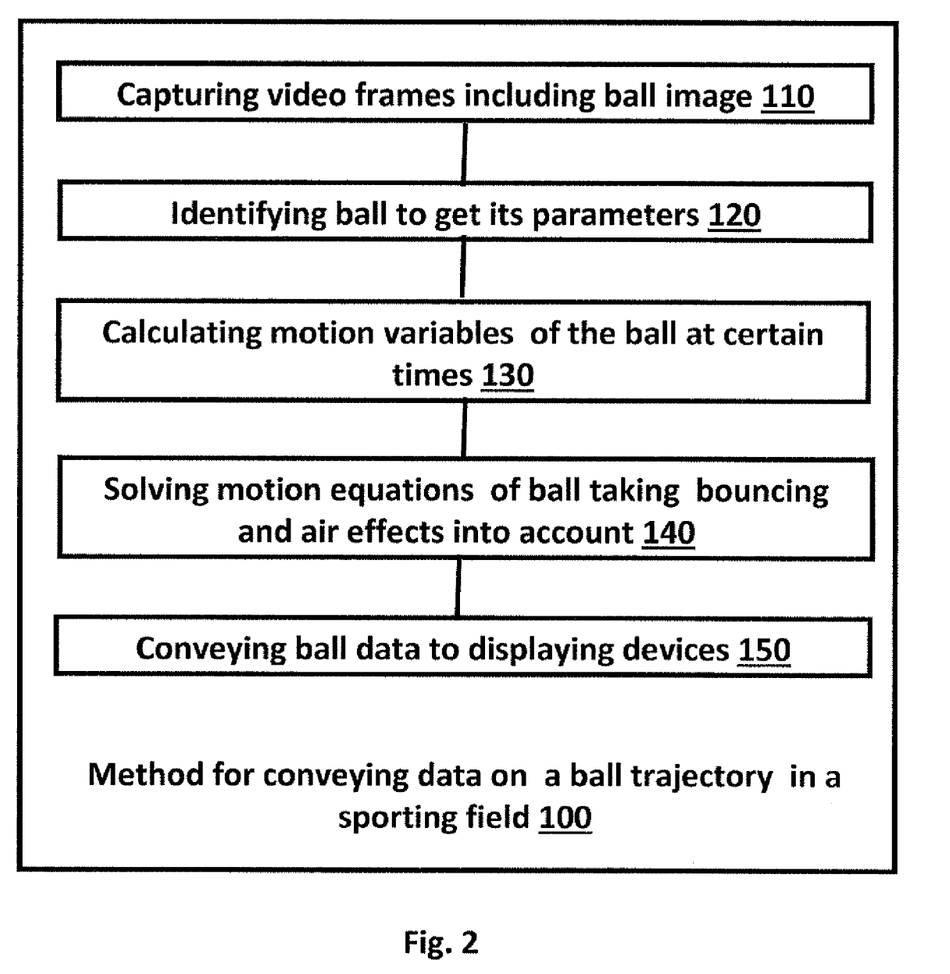
FIG. 2 is a flow chart of a method for conveying data on a ball trajectory in a sporting field

Referring now to FIG. 2, it presents a flow chart of a method 100 for conveying data on a ball 30 in a sporting filed 20. Method 100 includes a step 110 of capturing video frames of sporting field 20 by several video cameras, 10 and 15 for example, to get several video frames which include image of ball 30, a step 120 of identifying ball 30 in captured video frames to get associated position and velocity at certain times, a step 130 of calculating motion variables of ball 30 using the ball position and velocity, a step 140 of solving motion equations for anticipated ball trajectory taking into account certain effects, and a step 150 of conveying data related to the anticipated object trajectory to displaying devices 50. The certain effects are an effect of ball collision with a ground surface, air friction, and effect of wind on the ball.

The effect of air friction or air drag depends on air density or pressure, which may be measured by a local barometer or obtained from a local weather channel. The air drag adds a force term to the equation of motion directed to slow ball velocity. The drag force depends on velocity linearly at low velocity and bi-linearly at high velocity. Ball aerodynamics is discussed by Mehta and Pallis in "Dynamics-sports ball aerodynamics:effects of velocity, spin and surface roughness" pages 185-197 in "Material and science in sports" eds. Froes and Haake, TMS edition, Warrendale, Pa. 15086, US, 2001, and reference therein.

The effect of wind depends on air velocity and direction, which may be measured continuously in the playing field using anemometer linked to processor 45.

The interaction of a spinning object with air may also have some effect on the object trajectory, especially whenever the object is not spherical. That lateral force is discussed by Watts and Ferrer in "The lateral force on a spinning sphere: Aerodynamics of a curveball", American Journal of Physics vol. 55, page 40, 1987.

Method 100 may be used for conveying data on a throwing action in a sporting event. For example, in baseball a pitcher throws the ball to the batter. The throw velocity, for example, is of substantial interest for viewers, commentators, coaches and players.

Rather than being fixed in position and in photographing parameters, cameras 10 and 15 may be dynamic cameras free to move by an operator on a linear track, to be tilted angularly, and to have zooming capability. Thus, the camera state is defined by several parameters and their values determine parameters of the captured ball image. Therefore, processor 45 needs the value of the variable camera parameters in order to calculate position and velocity of an identified ball 30 in a video frames. For that aim, cameras 10 and 15 are calibrated using captured artifacts of the playing field. In addition or alternatively, the cameras are calibrated using data provided by a geodesic device.

The anticipated object trajectory may complement trajectory segments absent from a captured ball trajectory because of occluding of ball 30 from a video camera.

For the use of commentators, it may be of upmost importance that all steps of the method, including step 150 of conveying the anticipated ball trajectory, are performed fast enough to precede the actual object trajectory.

A Shadow Embodiment

Figures 3A, 3B:
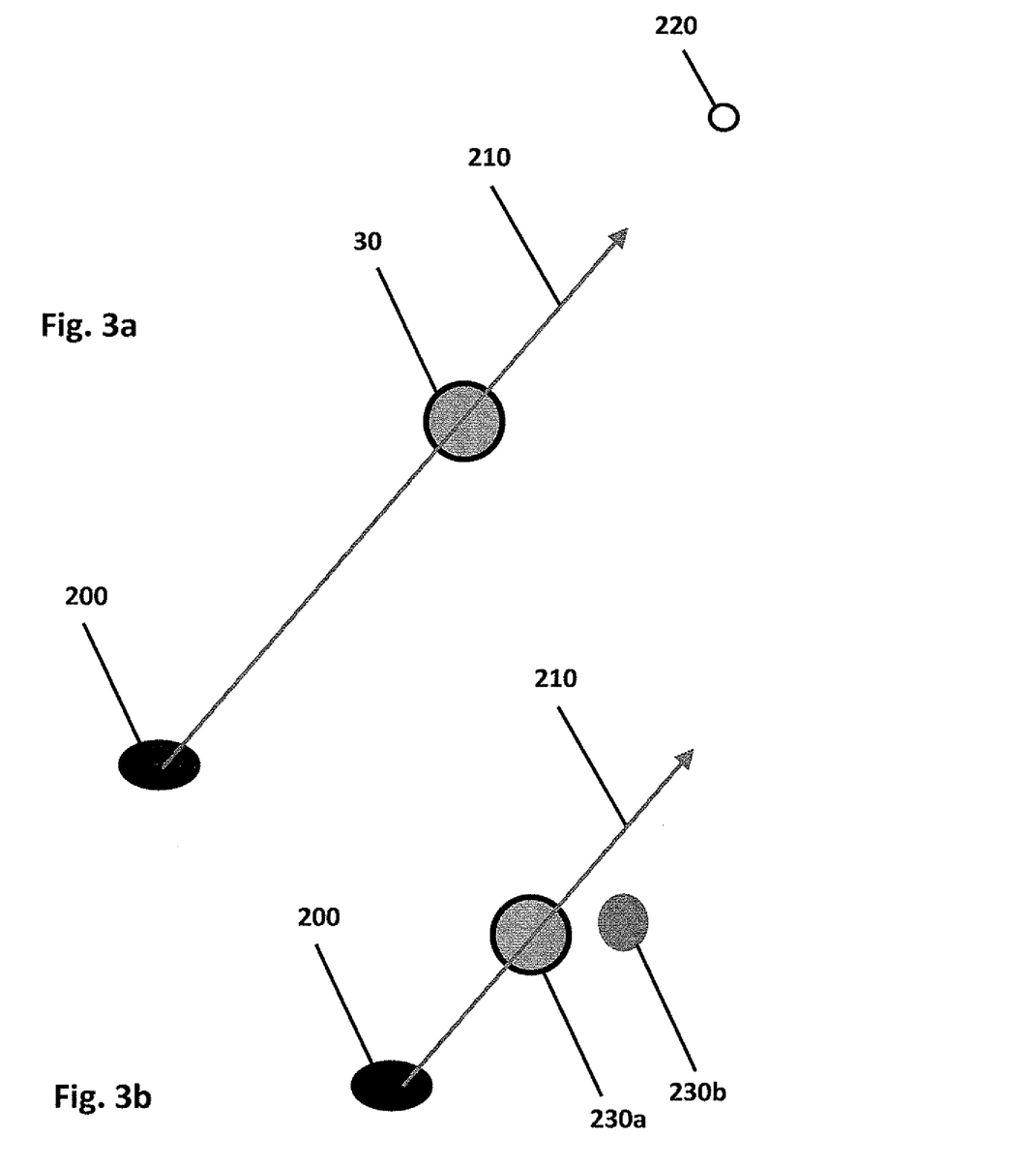
FIG. 3a depicts a ball illuminated by the sun such as to project a shadow on the ground.
FIG. 3b depicts two candidate detected balls in the image, one of which is elected using shadow data.

In a game conducted during a sunny day, a flying ball 30 may project a clear shadow 200. as shown in FIG. 3a. Shadow 200 may be captured on the ground intersection with a line 210 which is directed to the sun 220 and crosses the ball center. Note that the sun direction projected on the captured image is known in the art as the sun's vanishing point on the captured image. Thus, ball shadow 200 is located on line 210 connecting ball 30 and the sun's vanishing point. Shadow 200 may be captured by video cameras 10 and 15, and after being identified as the shadow of ball 30, its location may provide supplementary data for calculating the ball trajectory.

Figure 4:
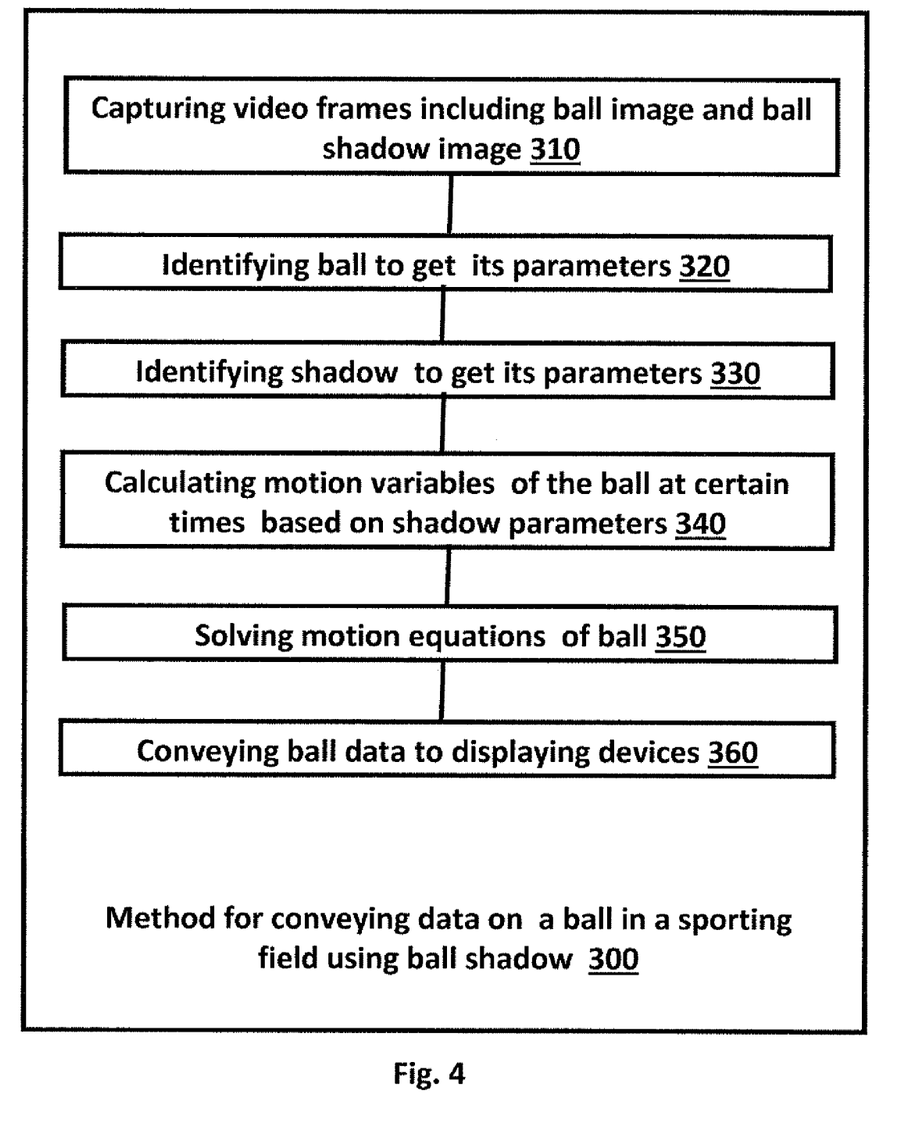
FIG. 4 is a flow chart of a method for conveying data on a ball trajectory in a sporting field using the ball shadow.

FIG. 4 is a flow chart of a method for conveying data on a ball 30 in a sun illuminated sporting field using a clear shadow 200 of ball 30. Method 300 includes a step 310 of capturing video frames of the playing field by several video cameras to get certain video frames including images of the ball and a video frame which include image of shadow 200, a step 320 of identifying the ball in captured video frames to get ball location in the captured video frames, a step 330 of identifying shadow 200 in captured video frame to get its location in the video frame, a step 340 of calculating ball motion variables like three dimensional position and velocity in real space using the shadow location and the direction 210 of the light source, a step of solving motion equations for anticipated bail trajectory, and a step 360 of conveying data related to the anticipated ball trajectory to displaying device 50.

Besides a sunny day, method 300 may be used at night as well provided that the sporting field is illuminated by a few light sources of small angular extension, such as to create well separated clear shadows of ball 30.

Method 300 may be used, for example, in a case that ball 30 is occluded from camera 10 by a player body, such that processor 45 is unable to calculate a three dimensional position of ball 30 as only a video frame from camera 15 is available. However, shadow 200 is captured in certain video frames by cameral 10 from which the ball is occluded. Processor 45 analyzes shadow location, takes into account that ball 30 and shadow 200 are aligned along sun direction 210, and combines this information with the ball location in camera 15 in which the ball is visible, and thus is able to locate ball 30 in the three dimensional space.

In addition, identification of shadow 200 may be used when identification of ball 30 is interfered by having two candidate detected balls 230a and 230b, as shown in FIG. 3b, and there is some confusion regarding which candidate detected stands for ball 30. As candidate detected ball 230a lays over line 210 while candidate detected ball 230b lays away of line 210, processor 45 elects detected ball 230a as associated with playing ball 30.

A Ball-Bat Interaction Embodiment

The ball-bat interaction embodiment may be described in reference to FIGS. 1, 5a,5b and 5c. A batter 35 interacts with a ball 30 using a bat 420 he holds. The interaction of bat 420 with ball 30 is of great interest for the viewers, commentators and coaches, and thus worthwhile analyzing in detail. The interaction time is quite short and therefore hitting is barely captured by video cameras. Nevertheless, some data regarding the bat-ball interaction may be derived by capturing their motion prior to hitting and after hitting.

Figures 5A, 5B:
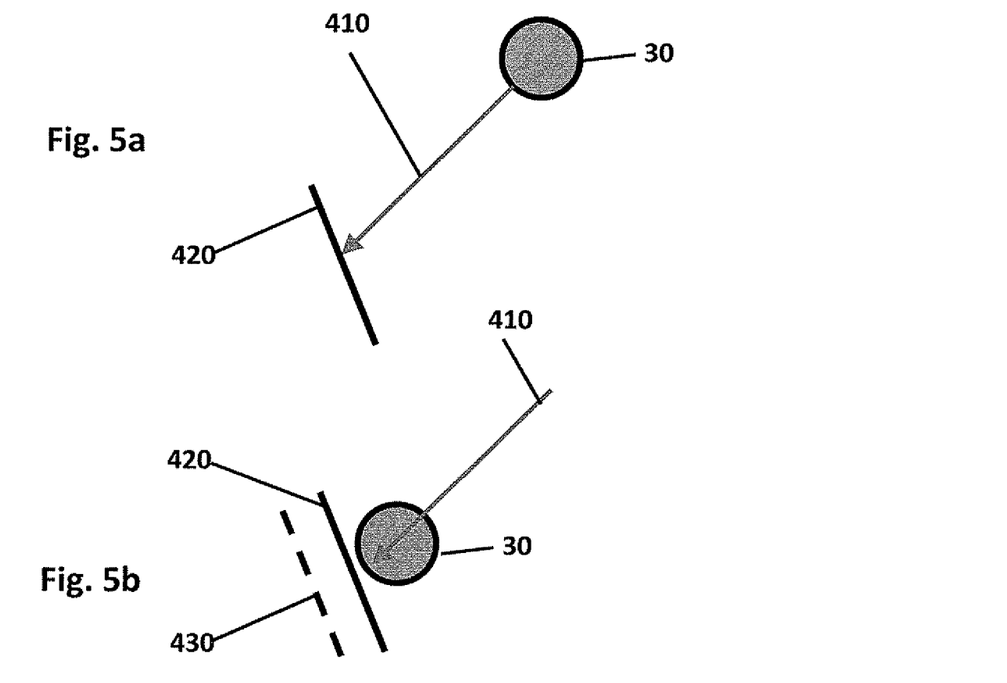
FIG. 5a illustrates a ball approaching a bat.
FIG. 5b illustrates the ball hitting the bat.
Figure 5C:
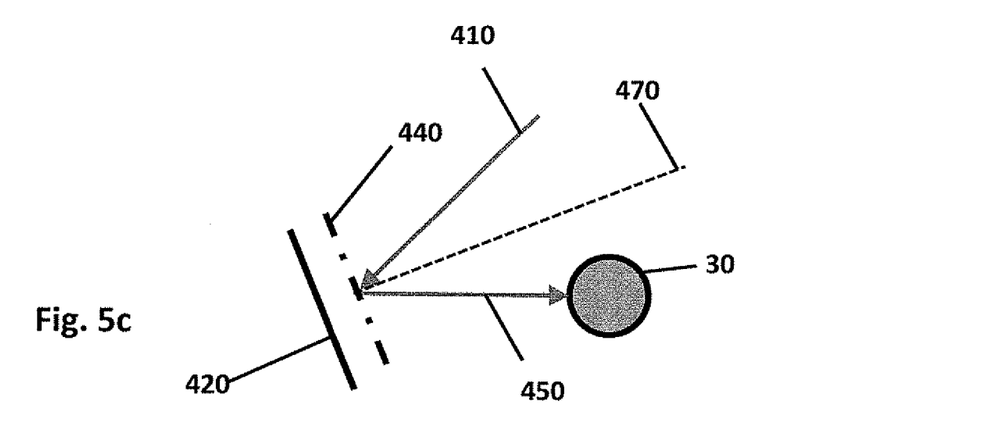
FIG. 5c illustrates the ball and the bat after the ball has hit the bat.

FIGS. 5a, 5b and 5c illustrate a collision between two solid bodies, ball 30 and bat 420. Prior to the collision, ball 30 propagates along arrow 410 while and bat 420 propagate towards a collision line 440. As result of hitting ball 30 by bat 420, bat 420 recoils towards line 430 while ball 30 changes propagation direction to arrow 450. The collision is not purely elastic and some kinetic energy is lost in the collision. A coefficient of restitution (bounciness) for certain kinds of a ball and a bat, available in the art of sports analysis, may be used in the calculation to account for the energy loss in the collision.

Figure 6:
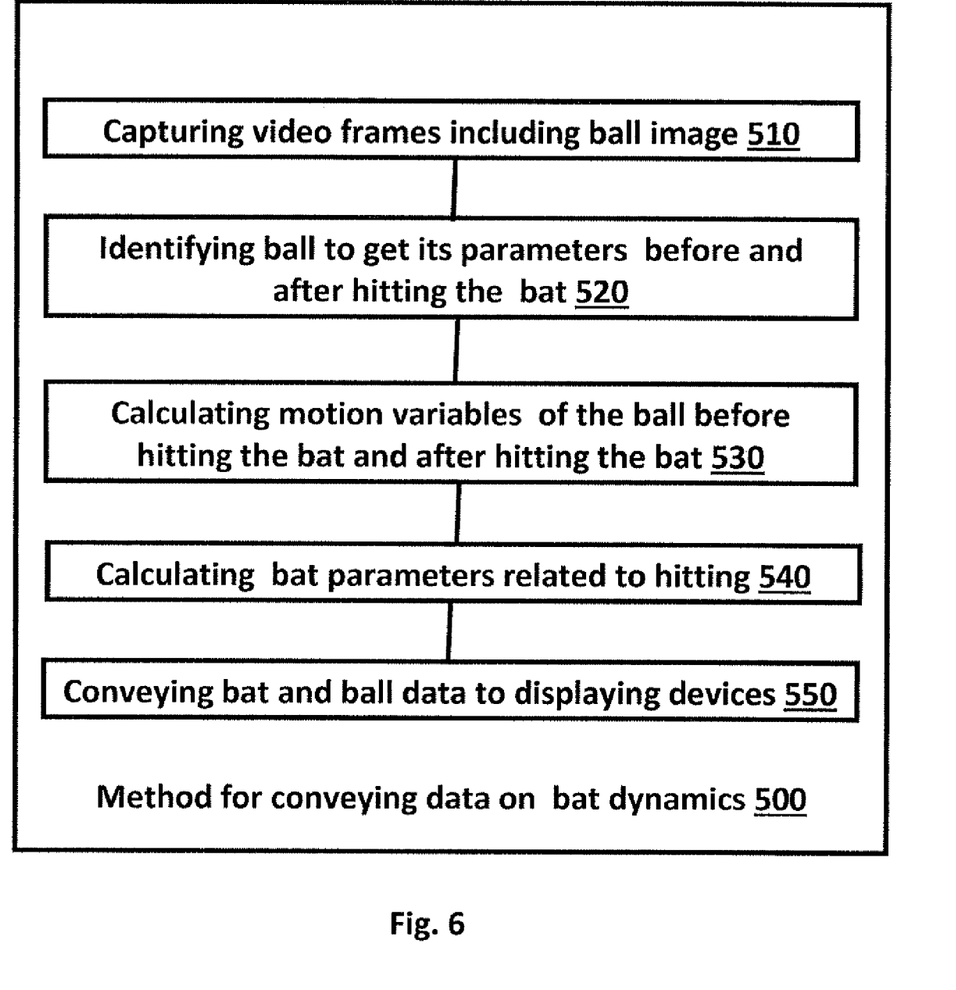
FIG. 6 is a flow chart of a method for conveying data on bat dynamics.

A flow chart of a method 500 for conveying data relating to a collision occurring in a playing field between of a ball 30 and a bat 420 is shown in FIG. 6. Method 500 includes a step 510 of capturing video frames of the playing field by video cameras to get video frames including image of ball 30, a step 520 of identifying ball 30 in captured video frames to obtain position of ball 30 at certain times before the collision on the video frames, and calculating real position and velocity of ball 30 before the collision. It is also included in method 500, step 540 of calculating position and velocity of bat 240 after the hitting, and a step 550 of conveying data related to the hitting to a displaying device 50.

However, the trajectory of ball 30 prior to being hit by bat 420 may be not enough to calculate parameters of bat 420. In one option, in addition to the motion variables or trajectory of ball 30 before the collision, the motion variables after the collision are also obtained by capturing appropriate video frames, followed by step 520 of identifying ball 30 in captured video frames to get ball location on video frames after the collision. These steps are followed by a step 530 of calculating position and velocity of ball 30 after the hitting or collision. Then, the location and pose of the bat during the collision, as well as the time of the collision may be found by continuing the trajectories of ball 30 before and after the collision and locating the bat at line 440 such that the intersection of the two trajectories resides on the bat surface during the collision. Also, line 440 is posed such that the bat hitting surface is vertical to a line 470 bisecting the angle between direction arrow 410 and direction arrow 450. That data on location and pose of bat 420 may be conveyed to a displaying device 50 within a predetermined time window of the hitting such as to provide the data to viewers while it is still fresh.

In a similar way, data on ball throw velocity, bat hit velocity, estimation of the ball ground hit position after the throw, and estimation on whether the ball would have hit wickets if it is not hit by the bat, or probability of hitting the wicket, may be achieved by analysis of captured video frames.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

What is claimed is:

1. A method for conveying data on a flying object in a playing field illuminated by at least one light source providing a shadow of the flying object, two or more video cameras viewing the playing field, at least one camera having at least one variable operating parameter, the method comprising:
   (a) capturing a plurality of video frames of the playing field by the two or more video cameras to get a plurality of video frames including images of the object and at least one video frame including image of the shadow of the flying object;
   (b) calibrating a value of the at least one variable operating parameter of the at least one camera using at least one location of at least one pre-existing artifact of the playing field, including:
      (i) said at least one location being taken by a measuring device,
      (ii) said value being associated with capturing video frames of said plurality of video frames, and
      (iii) said measuring device being one of a laser rangefinder and a theodolite;
   (c) identifying said object in captured video frames to get object parameters associated with said captured video frames, said object parameters being determined using said at least one variable operating parameter of said at least one video camera;
   (d) identifying said object shadow in at least one captured video frame to get parameters of the object shadow associated with said at least one captured video frame;
   (e) calculating one or more motion variables of said object using said object parameters, using said parameters of the object shadow, and using parameters associated with the light source;
   (f) based on the calculated motion variables, solving motion equations for determining an anticipated object trajectory; and
   (g) conveying data related to the anticipated object trajectory as calculated using said parameters of the object shadow to one or more devices.

2. The method of claim 1, wherein the method additionally comprises: complementing data absence caused by occluding of said object from a video camera of said two or more video cameras.

3. The method of claim 1, wherein said flying object includes a ball.

* * * * *